(12) United States Patent
Rolle

(10) Patent No.: US 11,514,065 B2
(45) Date of Patent: Nov. 29, 2022

(54) PROVIDING IMPLICIT INFORMATION NOT EXPLICITLY PERSISTED

(71) Applicant: SAP SE, Walldorf (DE)

(72) Inventor: Benny Rolle, Karlsruhe (DE)

(73) Assignee: SAP SE, Walldorf (DE)

( * ) Notice: Subject to any disclaimer, the term of this patent is extended or adjusted under 35 U.S.C. 154(b) by 122 days.

(21) Appl. No.: 17/037,323

(22) Filed: Sep. 29, 2020

(65) Prior Publication Data

US 2022/0100755 A1    Mar. 31, 2022

(51) Int. Cl.
*G06F 16/00* (2019.01)
*G06F 16/2458* (2019.01)
*G06F 16/28* (2019.01)
*G06N 5/04* (2006.01)

(52) U.S. Cl.
CPC ........ *G06F 16/2468* (2019.01); *G06F 16/284* (2019.01); *G06N 5/048* (2013.01)

(58) Field of Classification Search
None
See application file for complete search history.

(56) References Cited

U.S. PATENT DOCUMENTS

| | | | | |
|---|---|---|---|---|
| 2012/0117117 A1* | 5/2012 | Barnea | ............. | G06Q 10/067 |
| | | | | 707/E17.055 |
| 2013/0151486 A1* | 6/2013 | Narasimhan | ........... | G06Q 30/02 |
| | | | | 707/694 |
| 2013/0311518 A1* | 11/2013 | Agbaria | ............. | G06F 16/2365 |
| | | | | 707/E17.044 |
| 2014/0108460 A1* | 4/2014 | Casella dos Santos | .................... | |
| | | | | G06F 16/35 |
| | | | | 707/E17.089 |
| 2014/0108467 A1* | 4/2014 | Tutuk | .................. | G06F 16/2282 |
| | | | | 707/803 |
| 2016/0091890 A1* | 3/2016 | Fukatsu | ............. | G05B 19/4185 |
| | | | | 700/159 |
| 2021/0334251 A1* | 10/2021 | Mire | .................... | G06F 16/2282 |

* cited by examiner

*Primary Examiner* — Augustine K. Obisesan
(74) *Attorney, Agent, or Firm* — Schwegman Lundberg & Woessner, P.A.

(57) ABSTRACT

Techniques for accessing implicit information that is used by, but not explicitly persisted in, a computer system are disclosed. In some embodiments, a method comprises: storing a schema for a relational database, the schema indicating relationships between tables of the relational database; persisting explicit data concerning a data subject in at least one of the tables; processing the explicit data using a software application, the processing of the explicit data comprising: inferring implicit information based on the explicit data and the schema; and using the implicit information by the software application; receiving a request for a report of personal data concerning the data subject; and in response to the request, generating the report, the generating of the report comprising: inferring the implicit information based on the explicit data and the schema; and including the explicit data and the implicit information in the generated report.

20 Claims, 9 Drawing Sheets

502 — CUSTOMERS: customerid AS GUID PRIMARY KEY, firstname AS STRING, lastname AS STRING, dateofbirth AS DATE, email AS STRING.

WANTEDCUSTOMERS: customerid AS GUID PRIMARY KEY WITH FOREIGN KEY TO CUSTOMERS.customerid.

SALESORDERS: salesorderid AS GUID PRIMARY KEY, customerid AS GUID WITH FOREIGN KEY TO CUSTOMERS.customerid, itemlist AS STRING.

504 — CUSTOMERS FOREIGN KEY TO WANTEDCUSTOMERS WITH CUSTOMERS.customerid = WANTEDCUSTOMERS.customerid.

CUSTOMERS FOREIGN KEY TO SALESORDERS WITH CUSTOMERS.customerid = SALESORDERS.customerid.

506 — SELECT * FROM CUSTOMERS AS cust WHERE cust.email = parameter_email JOIN WITH WANTED CUSTOMERS WHERE cust.customerid = wanted.customerid AS wanted JOIN WITH SALESORDERS AS sales WHERE cust.customerid = sales.customerid WITH OUTPUT cust.firstname + cust.lastname + ", born on " + cust.dateofbirth + ", is registered with the email address " + cust.email + " as customer " + cust.customerid + ". This customer is " + wanted.customerid = -1 ? "not " : "" + "contained in the list of wanted customers. " + COUNTOF(sales.salesorderid) = 0 ? "This customer did not create any sales order." : ("This customer created the following sales orders: " + LOOP AT sales INTO sale sale.salesorderid + " with products " + sale.itemlist ENDLOOP).

*FIG. 5*

ANSWER TO REQUEST FOR PERSONAL DATA UNDER PROCESSING IN ACCORDANCE WITH ART. 15 OF GDPR

610 — PURPOSES OF PROCESSING:

620 — CATEGORIES OF PERSONAL DATA CONCERNED:

630 — RECIPIENTS OF PERSONAL DATA:

640 — PERIOD FOR WHICH PERSONAL DATA WILL BE STORED:

650 — RIGHT TO REQUEST ERASURE/RESTRICTION:

660 — RIGHT TO LODGE COMPLAINT:

670 — SOURCE OF INFO NOT COLLECTED FROM SUBJECT:

680 — AUTOMATED DECISION-MAKING:

*FIG. 6*

PROVIDING IMPLICIT INFORMATION NOT EXPLICITLY PERSISTED

TECHNICAL FIELD

The present application relates generally to the technical field of electrical computer systems, and, in various embodiments, to systems and methods of providing implicit information that is used by, but not explicitly persisted in, a computer system.

BACKGROUND

Software applications often process personal data of, or otherwise concerning, data subjects (e.g., users). However, current solutions for providing access to all of a data subject's personal data that is under processing by a software application are limited by the lack of persistent storage of implicit information. While certain personal data of a data subject may be explicitly stored and persisted for subsequent access, implicit information that is inferred during processing of the explicit data is not available outside of the runtime of the software application. As a result, computer systems lack the ability to perform computer operations using the implicit information outside of the runtime of the software application in which the implicit information was inferred, thereby hindering the functionality of the computer systems. In addition to the issues discussed above, other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 5 illustrates pseudocode for a data model, relational model metadata, and natural language descriptions, in accordance with some example embodiments.

FIG. 6 illustrates a generated report of personal data of a data subject that is under processing by a software application, in accordance with some example embodiments.

DETAILED DESCRIPTION

Figure 1:
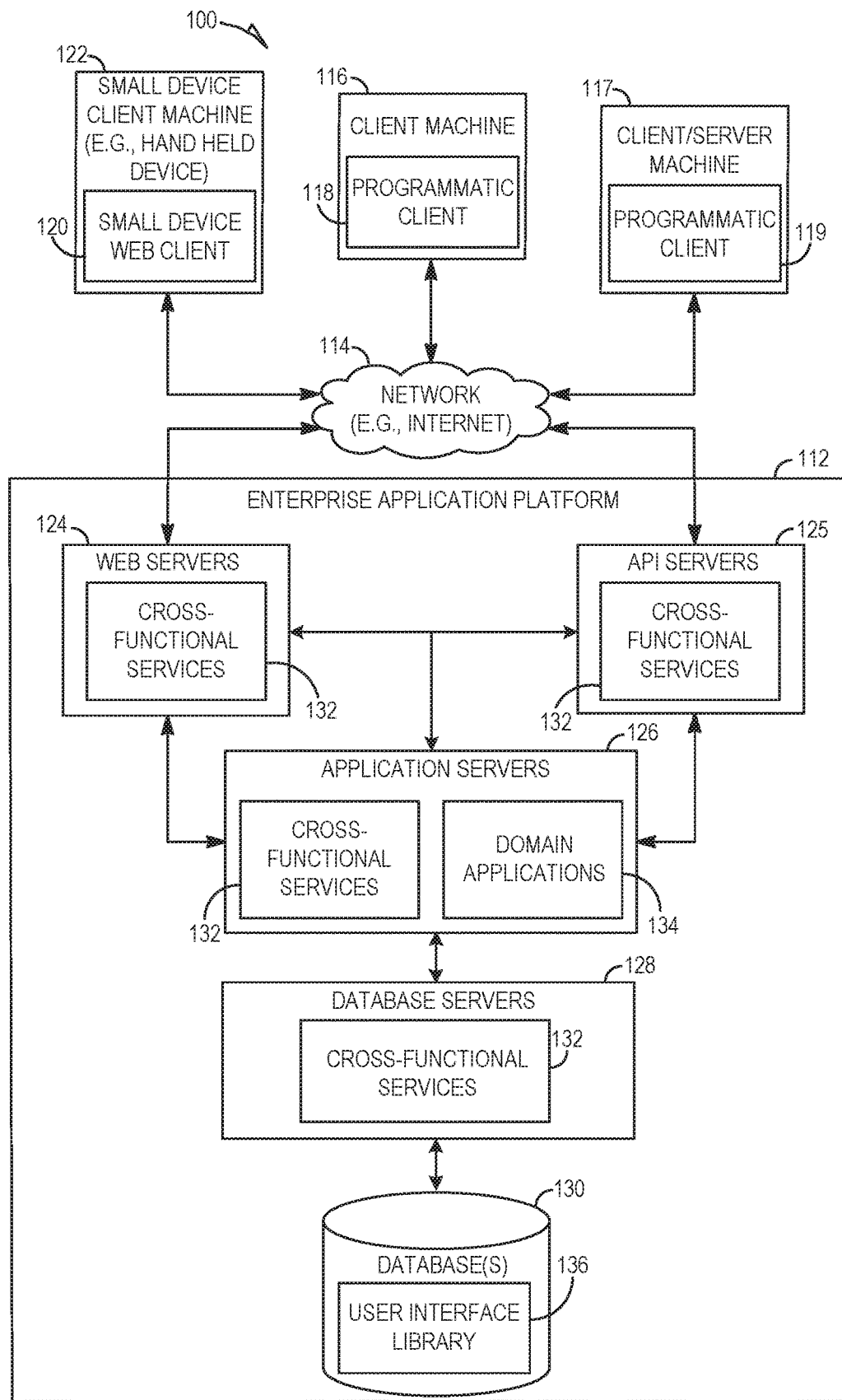
FIG. 1 is a network diagram illustrating a system, in accordance with some example embodiments.

Example methods and systems for providing implicit information that is used by, but not explicitly persisted in, a computer system are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to provide implicit information that is used by, but not explicitly persisted in, a computer system. In some example embodiments, a computer system is configured to use explicit data of a data subject and a schema of a database in which the explicit data is stored to infer implicit information outside of the runtime of a software application in which the implicit information was processed or under processing. The computer system may use the schema to identify a relationship between records in a first table of the database and records in a second table of the database, and then infer the implicit information based on the lack of a link between explicit data stored in the first table and any of the records in the second table. The term "explicit data" is used herein to refer to data that is explicitly persisted in a data storage, whereas the term "implicit information" is used herein to refer to information that is processed or under processing by a software application but that is not persisted in a data storage outside of the runtime of the software application.

By inferring the implicit information using the techniques disclosed herein, the computer system enables the use of the implicit information outside of the runtime of the software application in which the implicit information was initially inferred and processed, such as the user of the implicit information in other processes of the computer system (e.g., reporting of all of a data subject's personal data that is under processing by the computer system), thereby improving the functionality of the computer system. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112 instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
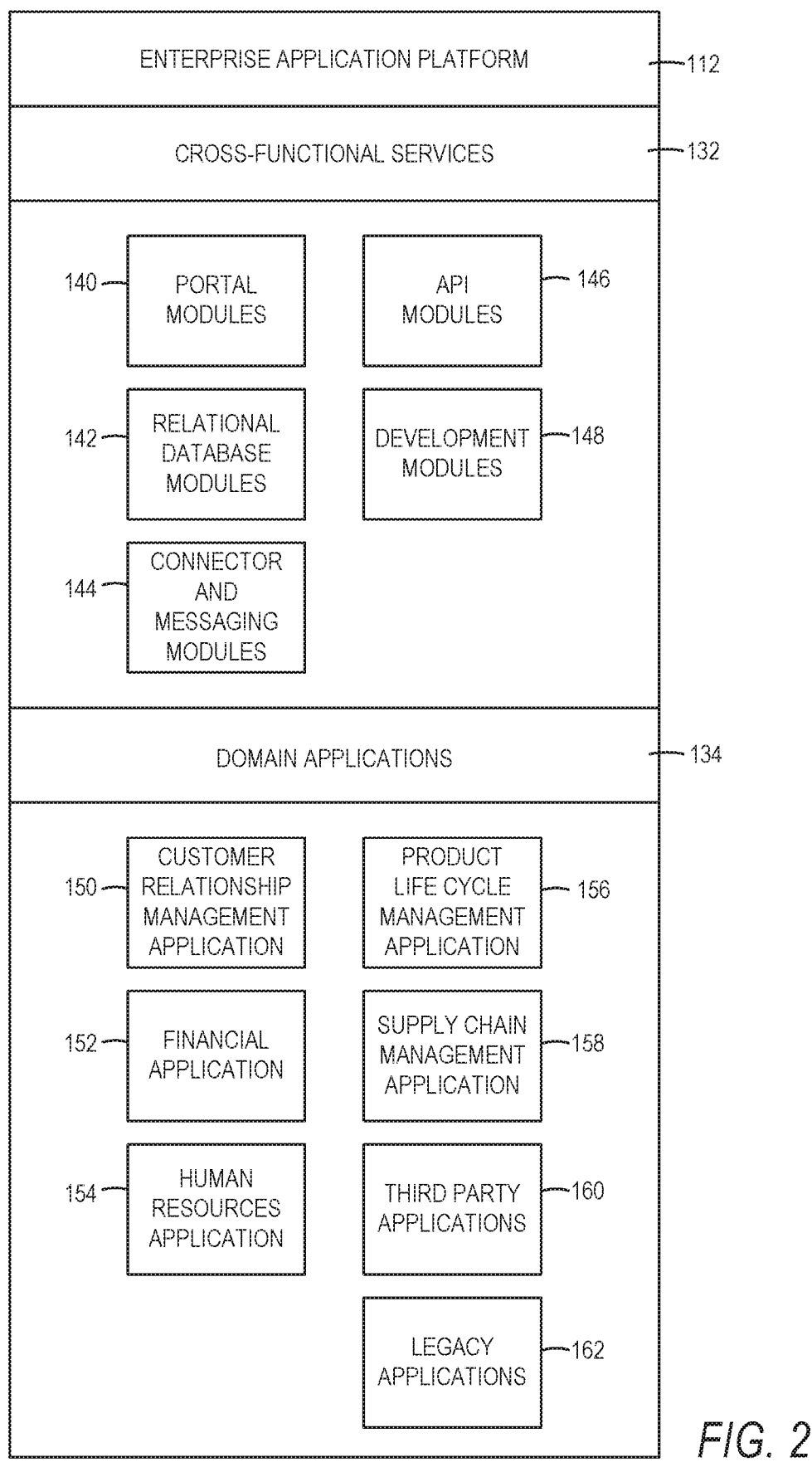
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
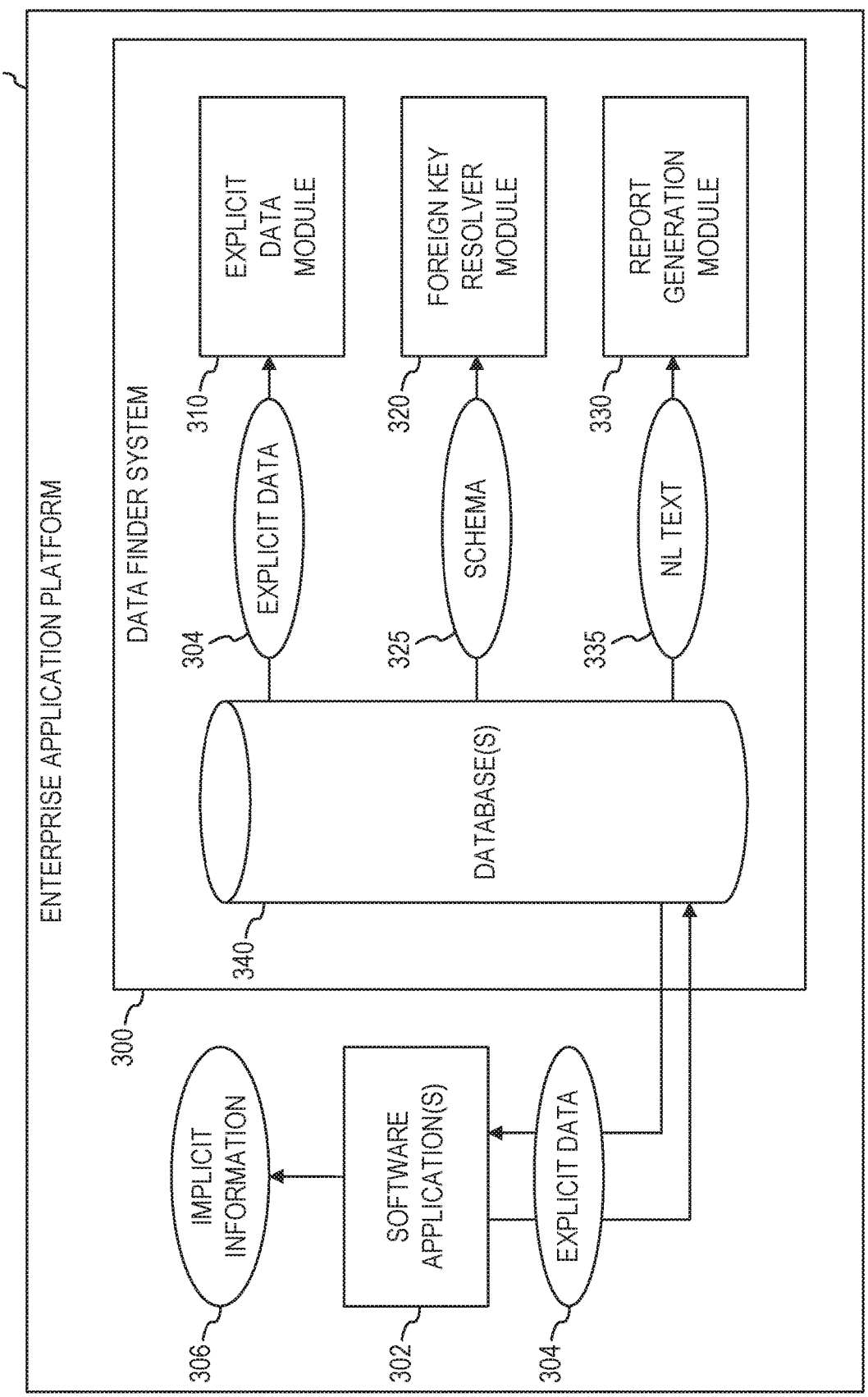
FIG. 3 is a block diagram illustrating a data finder system, in accordance with some example embodiments.

FIG. 3 is a block diagram illustrating a data finder system 300, in accordance with some example embodiments. In some embodiments, the data finder system 300 comprises any combination of one or more of an explicit data module 310, a foreign key resolver module 320, a report generation module 330, and one or more database(s) 340. The explicit data module 310, the foreign key resolver module 320, the report generation module 330, and the database(s) 340 can reside on a computer system, or other machine, having a memory and at least one processor (not shown). In some embodiments, the explicit data module 310, the foreign key resolver module 320, the report generation module 330, and the database(s) 340 are incorporated into the enterprise application platform 112 in FIGS. 1 and 2. However, it is contemplated that other configurations of the explicit data module 310, the foreign key resolver module 320, the report generation module 330, and the database(s) 340 are also within the scope of the present disclosure.

In some example embodiments, one or more of the explicit data module 310, the foreign key resolver module 320, the report generation module 330 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input. In some example embodiments, one or more of the explicit data module 310, the foreign key resolver module 320, the report generation module 330 are configured to receive user input. For example, one or more of the explicit data module 310, the foreign key resolver module 320, the report generation module 330 can present one or more graphical user interface (GUI) elements (e.g., drop-down menu, selectable buttons, text field) with which a user can submit input. In some example embodiments, one or more of the explicit data module 310, the foreign key resolver module 320, the report generation module 330 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the data finder system 300 is configured to find all personal data of a data subject that is under processing by one or more software applications 302. A data subject is any individual person whose personal data can be processed (e.g., collected, stored, used as input for process, generated as output of a process, anonymized, destructed, or any other operation or set of operations that can be performed on data). A data subject can be identified, directly or indirectly, via an identifier, such as a name or an identification number. However, a dedicated identifier is not always necessary for identification of a data subject. A data subject may be identified in other ways as well, including, but not limited to, using various transactional data. For example, in embodiments where a data subject has authorized and enabled the tracking of the data subject's location using GPS data, the GPS data may be used to identify the data subject because the travel patterns of the data subject may be unique (e.g., at night at the home of the data subject, in the morning commute to the office of the data subject, in the evening commute back to the home of the data subject).

The software application(s) 302 may comprise a program or group of programs designed for end users. In some example embodiments, the software application(s) 302 is implemented within the enterprise application platform 112. For example, the software application(s) 302 may comprise any combination of one or more of the domain applications 134 (e.g., the customer relationship management application 150, the financial application 152, the human resources application 154, the product life cycle management application 156, the supply chain management application 158, the third party applications 160, the legacy applications 162). However, other configurations of the software application(s) 302 are also within the scope of the present disclosure.

The software application(s) 302 may process a data subject's explicit data 304 that is explicitly persisted in a persistent storage of the database(s) 340. In some example embodiments, the explicit data 304 is persisted in a relational database of the database(s) 340. However, the explicit data 304 of the data subject may be persisted in other types of databases as well. For example, instead of a relational database, the features of the present disclosure may be implemented using a graph database, which is a database that uses graph structures with nodes, edges, and properties to represent and store data. The software application(s) 302 may also process implicit information 306 that is inferred from the data subject's explicit data 304. However, although the implicit information 306 may be stored temporarily in Random Access Memory (RAM) within the runtime of the software application(s) 302, the implicit information 306 is not persisted outside of the runtime of the software application(s) 302.

In many countries, data protection legislation exists that contains extensive data subject rights. For example, in Europe, these data subject rights are regulated in the General Data Protection Regulation (GDPR). In the context of the GDPR, the data subject has the right to obtain access to personal data concerning himself or herself. To execute this right, the data subject can ask for the personal data without formal requirements. The controller of the personal data, such as the administrative entity controlling the computer system in which the personal data is stored, must find all personal data concerning that data subject that are under processing and provide this personal data to the data subject. However, as previously discussed, information can be contained in software applications in various forms without being explicitly persisted in a persistent data storage.

Currently, the GDPR is one of the strictest data protection legislations. Art. 4(1) of the GDPR explains that "personal data" means any information relating to an identified or identifiable natural person ("data subject"), and an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. Personal data includes information touching a data subject's private and family life, but may also include information regarding whatever types of activity is undertaken by the data subject, like that concerning working relations or the economic or social behavior of the data subject. Personal data may include data of various formats, including, but not limited to, text, images, video, and audio.

There is a fundamental difference between data and information. Data is the technical representation of something that uses a given character set in a given syntax. For example, the character set of computer memory is 0 and 1, the applicable syntax depends on the data type: Strings may be represented with ASCII representation, pictures may be represented by a syntax defined by the PNG or PEG file type, music may be represented by 0's and 1's following the syntax defined by the MP3 file type, numbers may be represented by various formats (e.g., integer, unsigned long integer, double precision floating number). However, although the data itself may use a defined character set and follow a defined syntax, the data itself is not yet information. In order to become information, the data must have a meaning (or the meaning must be clear). For example, the data "100 EUR" might refer to an invoice amount or, alternatively, to a total turnover. In an example where the data "100 EUR" refers to an invoice amount, the persisted data "100 EUR" may represent the information "This invoice has the invoice amount 100 EUR". That information, if it concerns a data subject, is protected by the GDPR, as well as the data itself. For the data subject, it is desirable to receive this information as part of an information statement in response to a request by the data subject for all personal data of the data subject under processing.

Nearly every data item in a software application also represents information, since a meaning may be made explicit by database table fields and the context in which data items are stored. However, there can be information that is under processing without explicit representation by a data item in the database(s) 340 or other persistent storage. For example, instead of storing the information explicitly, the information can be hidden by negative storage, where the persistence of explicit data in one table of a database and the lack of a certain data in another table of the database can be used to infer implicit information. This negative storage may occur intentionally, such as by the controller of the data when the controller wants to debate that certain data is not stored, or this negative storage may occur unintentionally, such as for technical reasons.

Figure 4:
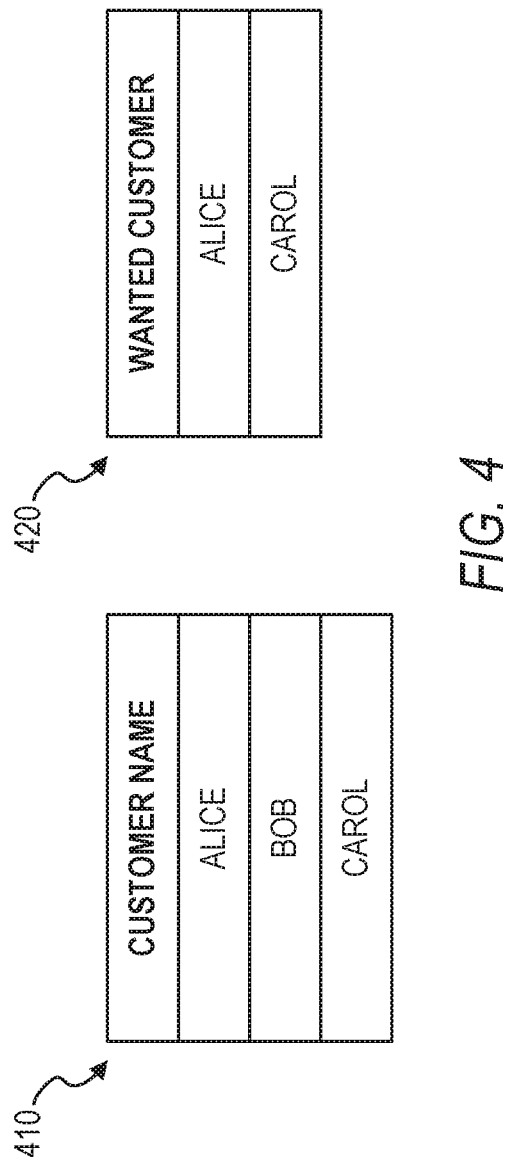
FIG. 4 illustrates an example of a first table and a second table of a relational database from which implicit information is inferred, in accordance with some example embodiments.

FIG. 4 illustrates an example of a first table 410 and a second table 420 of a relational database from which implicit information is inferred, in accordance with some example embodiments. In a simplified example, the first table 410 stores a list of all customers, which includes Alice, Bob, and Carol, while the second table 420 stores a list of wanted customers, which includes only Alice and Carol. By applying the concept of negative storage, the data finder system 300 can infer that Bob is not a wanted customer based on the relationship between the first table 410 and the second table and the fact that Bob is included in the list of all customers that is persisted in the first table 410 and omitted from the list of wanted customers that is persisted in the second table 420.

Referring back to FIG. 3, in some example embodiments, the data finder system 300 is configured to store a schema 325 for a relational database of a persistent data storage of the database(s) 340. The schema 325 indicates a skeleton structure that represents the logical view of the entire database, defining how the data of the relational database is organized and how the relations among them are associated. The schema 325 defines the entities of the relational database and the relationship among all of the entities. In some example embodiments, the schema 325 comprises metadata describing details of the relational database, including, but not limited to, tables, columns, constraints, foreign keys, and indexes. Other types of schema metadata are also within the scope of the present disclosure. The schema 325 may indicate one or more relationships between a plurality of tables of the relational database (e.g., a relationship between the first table 410 and the second table 420 in FIG. 4).

In some example embodiments, the data finder system 300 is configured to persist explicit data 304 of a data subject in at least one of the plurality, of tables of the relational database. The explicit data 304 may have been entered manually by a user of the software application(s) 302 via a user interface of the software application(s) 302. Additionally or alternatively, the explicit data 304 may have been created automatically by the software application(s) 302 via one or more processes of the software application(s) 302, such as the automatic calculation and storage of invoice data based on account information of a data subject. Other original sources of the explicit data 304 are also within the scope of the present disclosure.

In some example embodiments, one or more of the software applications 302 process the explicit data 304 of or otherwise concerning the data subject using one or more processes of the software application(s) 302. The processing of the explicit data 304 may comprise inferring implicit information 306 in a first instance (in which the implicit information 306 is being inferred in order to be used by the software application(s) 302) based on the persisted explicit data 304 and the stored schema 325. The software application(s) 302 then use the inferred implicit information 306 of the first instance in the one or more processes of the software application(s) 302.

In some example embodiments, the data finder system 300 is configured to receive a request for a report 600 of all of the personal data of or otherwise concerning the data subject that is under processing by the software application(s) 302. The request may comprise a user-initiated request that is triggered in response to user input received from a computing device of a user. For example, the data subject may manually select, via a user interface of the report generation module 330 displayed on the computing device of the data subject, a user interface element that is configured to transmit the request for all of the data subject's personal data that is under processing by the software application(s) 302. Alternatively, the request may be one of a plurality of requests that are automatically triggered on a periodic basis. For example, the data finder system 300 may be configured to initiate the request for all of the data subject's personal data that is under processing by the software application(s) 302 on a monthly basis, such as on the first day of every month. The request may be triggered or initiated in other ways as well.

In some example embodiments the report generation module 330 is configured to, in response to the receiving of the request, generate a report of the data subject's personal data that is under processing. The report generation module 330 may generate the report by inferring the implicit information 306 in a second instance (in which the implicit information 306 is being inferred in order to be used by the report generation module 330 for generation of the report) based on the persisted explicit data 304 and the stored schema 325. For example, the explicit data module 310 may retrieve the data subject's explicit data 304 that is being persisted in the database(s) 340 using an identifier of the data subject, and then communicate the retrieved explicit data 304 to the report generation module 330.

The foreign key resolver module 320 may access the schema 325 stored in the persistent storage of the database(s) 340 and identify a relationship between records in a first table (e.g., the first table 410 in FIG. 4) of the plurality of tables and records in a second table (e.g., the second table 420 in FIG. 4) of the plurality of tables based on the stored schema 325, such as by scanning the schema 325 stored in the database(s) 340 to identify each table (e.g., the first table) that has a foreign key that references another table (e.g., the second table). In some example embodiments, the explicit data module 310 is configured to scan the first table to determine that at least a portion of the persisted explicit data 304 is stored in the first table.

The data finder system 300 may use the explicit data 304 retrieved by the explicit data module 310 and the relationship identified by the foreign key resolver module 320 to determine that there is no link between the portion of the persisted explicit data 304 stored in the first table and any of the records in the second table. In some example embodiments, the foreign key resolver module 320 examines the first table and the second table to determine whether there are any links between any records in the portion of the persisted explicit data 304 stored in the first table and any records in the second table.

In some example embodiments, the data finder system 300 is configured to determine the implicit information 306 based on a combination of the identifying of the relationship, the determination that the at least a portion of the persisted explicit data 304 is stored in the first table, and the determination that there is no link between the at least a portion of the persisted explicit data 304 stored in the first table and any of the records in the second table. For example, the report generation module 330 may use the determination that the stored schema 325 indicates a relationship between records in the first table and records in the second table and the determination that some explicit data 304 concerning the data subject is stored in the first table to interpret the determination that there is no link between the portion of the explicit data 304 in the first table and any records in the second table as an indication that there is implicit information 306 related to the lack of any link between the portion of the explicit data 304 in the first table and any records in the second table. The report generation module 330 may use a set of translation rules stored in the database(s) 340 to translate the determination that there is no link between the portion of the explicit data 304 in the first table and any records in the second table into the implicit information 306, as previously discussed.

As previously discussed, in some example embodiments, instead of a relational database being used, some other type of database may be used. For example, the features of the present disclosure may be implemented using a graph database. In such embodiments in which a graph database is used, properties of the graph may be used to find implicit information. For example, the data finder system 300 may detect or identify a missing link within a graph database and interpret the existence of this missing link as a type of negative storage based on a schema of the graph database, similar to how the report generation module 330 may use the determination that the stored schema 325 indicates a relationship between records in the first table and records in the second table and the determination that some explicit data 304 concerning the data subject is stored in the first table to interpret the determination that there is no link between the portion of the explicit data 304 in the first table and any records in the second table as an indication that there is implicit information 306 related to the lack of any link between the portion of the explicit data 304 in the first table and any records in the second table.

In some example embodiments, the report generation module 330 is configured to include the persisted explicit data 304 and the inferred implicit information 306 of the second instance in the generated report of the personal data concerning the data subject. In generating the report, the report generation module 330 may retrieve stored natural language text 335, and then include the natural language text 335 in the report in association with the inferred implicit information 306 of the second instance.

In some example embodiments, the report generation module 330 is configured to cause the generated report 600 to be displayed on a computing device. The generated report 600 may be displayed on a computing device of the data subject. For example, the report 600 may be automatically transmitted to an electronic mail address of the data subject in response to its generation, or the generated report 600 may be displayed on a user interface of the report generation module 330 via which the data subject requests and views the generated report 600. The generated report 600 may also be displayed on a computing device of a user other than the data subject, such as on the computing device of an administrative user of the software application(s) 302, an administrative user of the data finder system 300, or an administrative user of the enterprise application platform 112. The administrative user may then manually request, via selection of one or more user interface elements of the report generation module 330, that the generated report 600 be transmitted (e.g., via e-mail) to the data subject.

FIG. 5 illustrates pseudocode for a data model 502, relational model metadata 504, and natural language descriptions 506, in accordance with some example embodiments. In some example embodiments, the data finder system 300 is configured to use the data model 502 and the relational model metadata 504 of a relational database to determine the type of data stored in each table in the relational database, as well as the relationships between records of different tables in the relational database. The data model 502 and the relational model metadata 504 may be stored in the database(s) 340. The data model 502 and the relational model metadata 504 provide indications to the data finder system 300 as to where to find the implicit information 306 concerning the data subject. For example, the data model 502 and the relational model metadata 504 may be used as the schema 325 in identifying the explicit data 304 and the implicit information 306 concerning the data subject.

The natural language descriptions 506, which may be stored in the database(s) 340, may be used by the report generation module 330 to insert natural language text 335 into the generated report. The natural language text 335 may describe the explicit data 304 and the implicit information 306 concerning the data subject. In the example shown in FIG. 5, the pseudocode for the natural language descriptions 506 includes a structured query language (SQL) SELECT statement used to generate the report. The SELECT statement includes natural language text 335 explaining the explicit data 304 and the implicit information 306. The SELECT statement also includes logic configured to find the implicit information 306 based on the lack of certain data of the data subject in a particular table (e.g., "This customer is"+wanted.customerid=−1?"not":" " "contained in the list of wanted customers.").

FIG. 6 illustrates a generated report 600 of personal data concerning a data subject that is under processing by the software application 302, in accordance with some example embodiments. In the example shown in FIG. 6, the generated report 600 includes an indication 610 of the purposes of the processing of the personal data by the software application(s) 302, an indication 620 of the categories of the personal data concerned, an indication 630 of the recipients or categories of recipient to whom the personal data have been or will be disclosed, an indication 640 of the envisaged period for which the personal data will be stored, or, if not possible, the criteria used to determine that period, an indication 650 of the existence of the right to request from the controller rectification or erasure of personal data or restriction of processing of personal data concerning the data subject or to object to such processing, an indication 660 of the right to lodge a complaint with a supervisory authority, an indication 670 of any available information as to the source of any personal data that is not collected from the data subject, and an indication 680 of the existence of any automated decision-making used in relation to the personal data concerning the data subject, including profiling, meaningful information about the logic involved, as well as the significance and the envisaged consequences of such processing for the data subject. Other configurations of the generated report 600 are also within the scope of the present disclosure.

Figure 7:
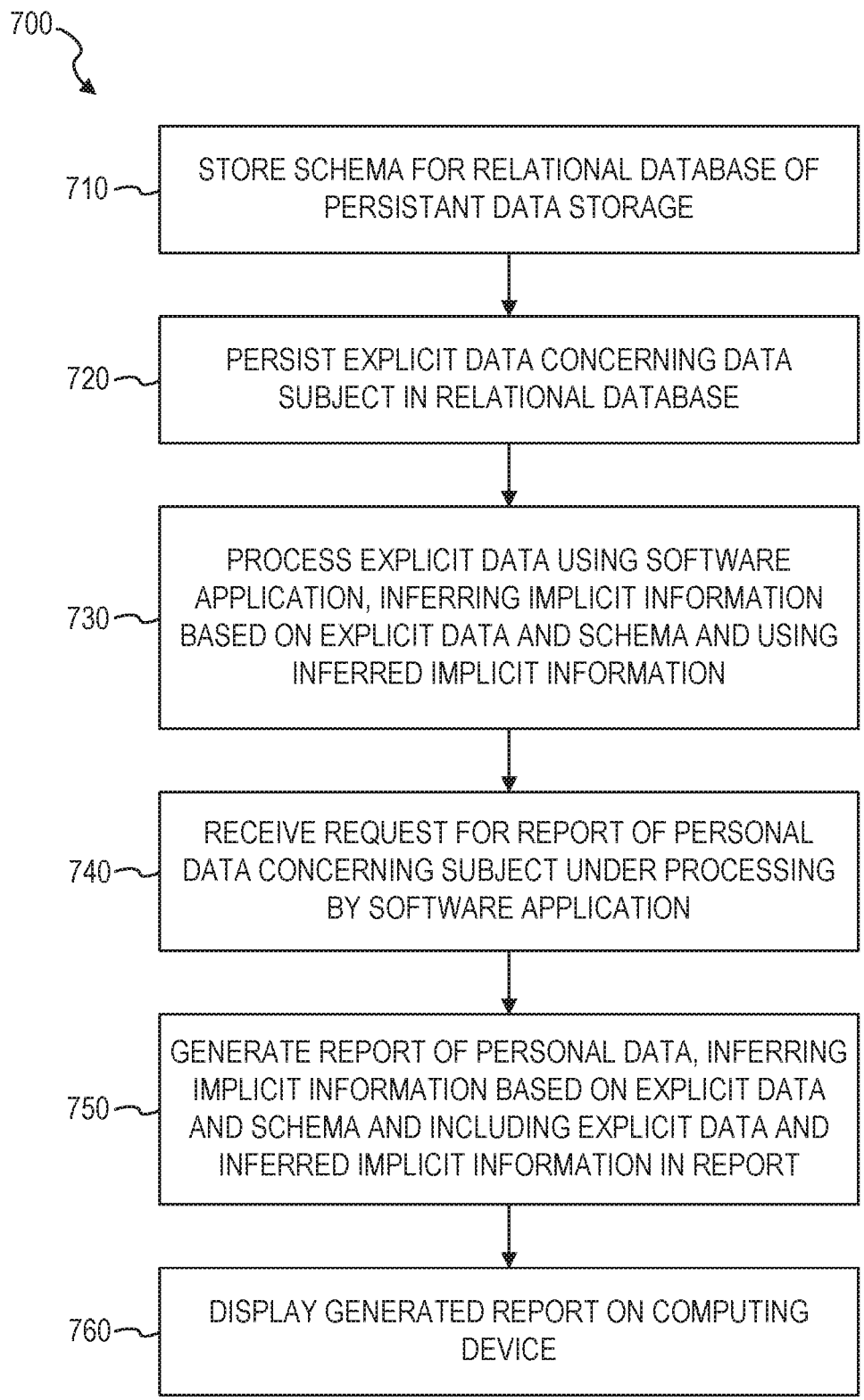
FIG. 7 is a flowchart illustrating a method of providing implicit information that is used by, but not explicitly persisted in, a computer system, in accordance with some example embodiments.

FIG. 7 is a flowchart illustrating a method 700 of providing implicit information that is used by, but not explicitly persisted in, a computer system, in accordance with some example embodiments. The method 700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 700 are performed by the components shown in FIG. 3, as described above.

At operation 710, the data finder system 300 stores a schema 325 for a relational database of a persistent data storage. For example, in FIG. 3, the schema 325 for a relational database of a persistent storage is stored in the database(s) 340. In some example embodiments, the schema 325 indicates relationships between a plurality of tables of the relational database.

The data finder system 300 persists explicit data 304 of a data subject in at least one of the plurality of tables of the relational database, at operation 720. The explicit data 304 may have been entered manually by a user of the software application(s) 302 or may have been created by the software application(s) 302. Other original sources of the explicit data 304 are also within the scope of the present disclosure.

Then, at operation 730, the software application(s) 302 processes the explicit data 304 concerning the data subject using one or more processes of the software application(s) 302. In some example embodiments, the processing of the explicit data 304 comprises inferring implicit information 306 in a first instance based on the persisted explicit data 304 and the stored schema 325, and then using the inferred implicit information 306 of the first instance in the one or more processes of the software application(s) 302. The software application(s) 302 may run within the enterprise application platform 112, However, the software application(s) 302 may alternatively be run separately from and independently of the enterprise application platform 112.

Next, at operation 740, the data finder system 300 receives a request for a report 600 of all of the personal data of or otherwise concerning the data subject that is under processing by the software application(s) 302. In some example embodiments, the request comprises a user-initiated request that is triggered in response to user input received from a computing device of a user. Alternatively, the request may be one of a plurality of requests that are automatically triggered on a periodic basis e.g., triggered monthly on the first day of every month).

Then, in response to the receiving of the request at operation 740, the data finder system 300 generates the report 600 of the personal data concerning the data subject that is under processing by the software application(s) 302, at operation 750. In some example embodiments, the generating of the report 600 comprises inferring the implicit information 306 in a second instance different from the first instance based on the persisted explicit data 304 and the stored schema 325, and then including the persisted explicit data 304 and the inferred implicit information 306 of the second instance in the generated report 600 of the personal data concerning the data subject. The generating of the report 600 may further comprise retrieving stored natural language text 335, and then including the natural language text in the report 600 in association with the inferred implicit information 306 of the second instance.

At operation 760, the data tinder system 300 causes the generated report 600 to be displayed on a computing device. The generated report 600 may be displayed on a computing device of the data subject. For example, the report 600 may be automatically transmitted to an electronic mail address of the data subject in response to its generation, or the generated report 600 may be displayed on a user interface of the report generation module 330 via which the data subject requests and views the generated report 600. The generated report 600 may also be displayed on a computing device of a user other than the data subject, such as on the computing device of an administrative user of the software application(s) 302, an administrative user of the data tinder system 300, or an administrative user of the enterprise application platform 112. The administrative user may then manually request, via selection of one or more user interface elements of the report generation module 330, that the generated report 600 be transmitted (e.g., via e-mail) to the data subject.

It is contemplated that any of the other features described within the present disclosure can be incorporated into the method 700.

Figure 8:
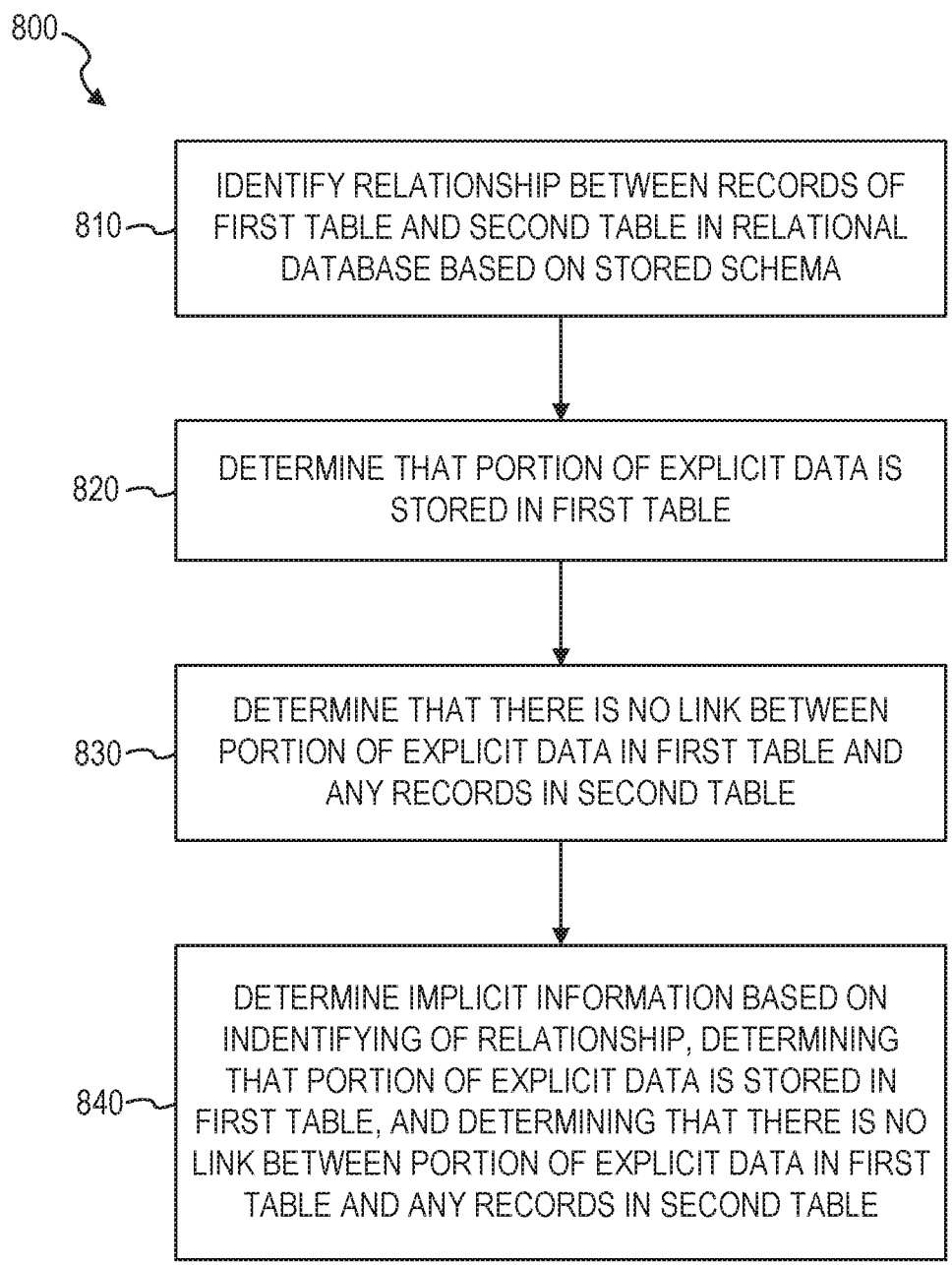
FIG. 8 is a flowchart illustrating a method of inferring implicit information, in accordance with some example embodiments.

FIG. 8 is a flowchart illustrating a method 800 of inferring implicit information, in accordance with some example embodiments. The method 800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 800 are performed by the components shown in FIG. 3, as described above.

At operation 810, the data finder system 300 identifies a relationship between records in a first table of the plurality of tables and records in a second table of the plurality of tables based on the stored schema 325. For example, the foreign key resolver module 320 of the data finder system 300 may scan the schema 325 stored in the database(s) 340 to identify each table (e.g., the first table) that has a foreign key that references another table (e.g., the second table).

The data finder system 300 determines that at least a portion of the persisted explicit data 304 is stored in the first table, at operation 820. For example, the explicit data module 310 may scan the first table to determine that at least a portion of the persisted explicit data 304 is stored in the first table.

At operation 830, the data finder system 300 determines that there is no link between the at least a portion of the persisted explicit data 304 stored in the first table and any of the records in the second table. For example, the foreign key resolver module 320 may examine the first table and the second table to determine whether there are any links between any records in portion of the persisted explicit data 304 stored in the first table and any records in the second table.

Then, at operation 840, the data finder system 300 determines the implicit information 306 based on a combination of the identifying of the relationship, the determination that the at least a portion of the persisted explicit data 304 is stored in the first table, and the determination that there is no link between the at least a portion of the persisted explicit data 304 stored in the first table and any of the records in the second table. For example, the report generation module 330 may use the determination that the stored schema 325 indicates a relationship between records in the first table and records in the second table and the determination that some explicit data 304 concerning the data subject is stored in the first table to interpret the determination that there is no link between the portion of the explicit data 304 in the first table and any records in the second table as an indication that there is implicit information 306 related to the lack of any link between the portion of the explicit data 304 in the first table and any records in the second table. The report generation module 330 may use a set of translation rules stored in the database(s) 340 to translate the determination that there is no link between the portion of the explicit data 304 in the first table and any records in the second table into the implicit information 306, as previously discussed.

The report generation module 330 may use the determination that there is no link between the at least a portion of the persisted explicit data 304 stored in the first table and any of the records in the second table in generating the report 600. In some example embodiments, the generating of the report 600, at operation 750 of the method 700 in FIG. 7, comprises retrieving stored natural language text 335 based on the determination that there is no link between the portion of the persisted explicit data 304 stored in the first table and any of the records in the second table, and then including the retrieved natural language text 335 in the report 600 in association with the inferred implicit information 306 of the second instance.

It is contemplated that any of the other features described within the present disclosure can be incorporated into the method 800.

The following paragraphs provide example embodiments.

Example 1 includes a computer-implemented method performed by a computer system having a memory and at least one hardware processor, the computer-implemented method comprising: storing a schema for a relational database of a persistent data storage, the schema indicating relationships between a plurality of tables of the relational database; persisting explicit data concerning a data subject in at least one of the plurality of tables of the relational database; processing the explicit data concerning the data subject using one or more processes of a software application, the processing of the explicit data comprising: inferring implicit information in a first instance based on the persisted explicit data and the stored schema; and using the inferred implicit information of the first instance in the one or more processes of the software application; receiving a request for a report of personal data concerning the data subject that is under processing by the software application; and in response to the receiving of the request, generating the report of the personal data concerning the data subject that is under processing by the software application, the generating of the report comprising: inferring the implicit information in a second instance different from the first instance based on the persisted explicit data and the stored schema; and including the persisted explicit data and the inferred implicit information of the second instance in the generated report of the personal data concerning the data subject.

Example 2 includes the computer-implemented method of example 1, wherein the inferring the implicit information in the second instance comprises: identifying a relationship between records in a first table of the plurality of tables and records in a second table of the plurality of tables based on the stored schema; determining that at least a portion of the persisted explicit data is stored in the first table; determining that there is no link between the at least a portion of the persisted explicit data stored in the first table and any of the records in the second table; and determining the implicit information based on the identifying of the relationship; the determination that the at least a portion of the persisted explicit data is stored in the first table; and the determination that there is no link between the at least a portion of the persisted explicit data stored in the first table and any of the records in the second table.

Example 3 includes the computer-implemented method of example 1 or example 2, wherein the generating of the report further comprises: retrieving stored natural language text based on the determining that there is no link between the at least a portion of the persisted explicit data stored in the first table and any of the records in the second table; and including the retrieved natural language text in the report in association with the inferred implicit information of the second instance.

Example 4 includes the computer-implemented method of any one of examples 1 to 3, further comprising causing the generated report to be displayed on a computing device.

Example 5 includes the computer-implemented method of any one of examples 1 to 4, wherein the request comprises a user-initiated request that is triggered in response to user input received from a computing device of a user.

Example 6 includes the computer-implemented method of any one of examples 1 to 5, wherein the request comprises one of a plurality of requests automatically triggered on a periodic basis.

Example 7 includes the computer-implemented method of any one of examples 1 to 6, wherein the software application runs within an enterprise application platform.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
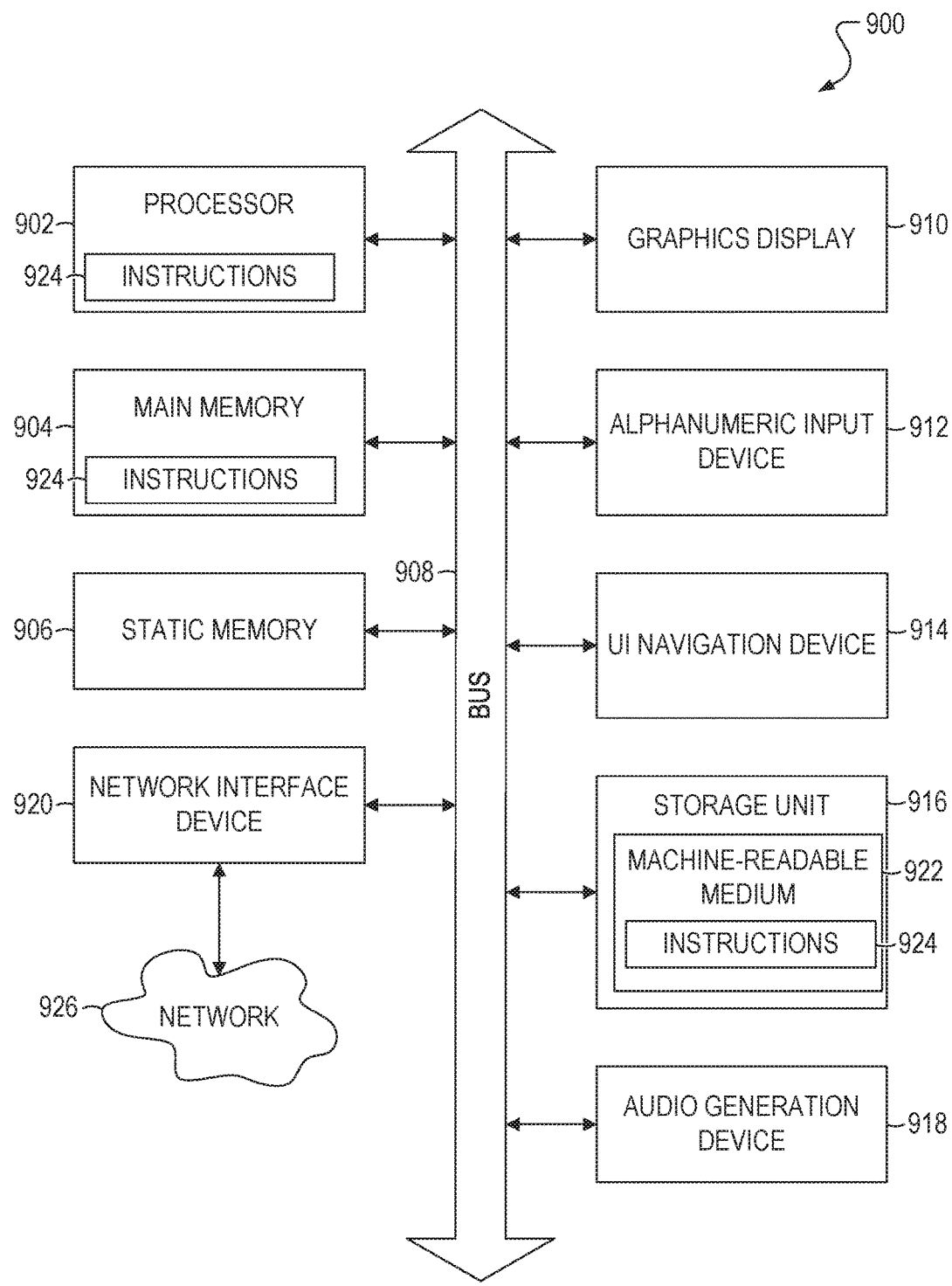
FIG. 9 is a block diagram of an example computer system on which methodologies described herein can be executed, in accordance with some example embodiments.

FIG. 9 is a block diagram of a machine in the example form of a computer system 900 within which instructions 924 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a graphics or video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a storage unit (e.g., a disk drive unit) 916, an audio or signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP), Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
    receiving a request for a report of personal data concerning a data subject that is under processing by a software application; and
    in response to the receiving of the request, generating the report of the personal data concerning the data subject that is under processing by the software application, the generating of the report comprising:
        inferring implicit information based on explicit data concerning the data subject that is persisted in at least one of a plurality of tables of a relational database of a persistent data storage and a schema for the relational database stored in the persistent data storage, the schema indicating relationships between the plurality of tables of the relational database, the explicit data and the implicit information having been processed by the software application during a runtime of the software application, the implicit information having been inferred during the runtime of the software application and not being persisted outside of the runtime of the software application, the inferring the implicit information comprising:
            identifying a relationship between records in a first table of the plurality of tables and records in a second table of the plurality of tables based on the stored schema;
            determining that at least a portion of the persisted explicit data is stored in the first table;
            determining that there is no pointer that links the at least a portion of the persisted explicit data stored in the first table to any of the records in the second table; and
            determining the implicit information based on the identifying of the relationship, the determination that the at least a portion of the persisted explicit data is stored in the first table, and the determination that there is no pointer that links the at least a portion of the persisted explicit data stored in the first table to any of the records in the second table; and
        including the persisted explicit data and the inferred implicit information in the generated report of the personal data concerning the data subject.

2. The computer-implemented method of claim 1, wherein the generating of the report further comprises:
    retrieving stored natural language text based on the determining that there is no pointer that links the at least a portion of the persisted explicit data stored in the first table to any of the records in the second table; and
    including the retrieved natural language text in the report in association with the inferred implicit information.

3. The computer-implemented method of claim 2, wherein the including the retrieved natural language text in the report comprises using a structured query language (SQL) SELECT statement that includes the retrieved natural language text to generate the report.

4. The computer-implemented method of claim 1, further comprising causing the generated report to be displayed on a computing device.

5. The computer-implemented method of claim 1, wherein the request comprises a user-initiated request that is triggered in response to user input received from a computing device of a user.

6. The computer-implemented method of claim 1, wherein the request comprises one of a plurality of requests automatically triggered on a periodic basis.

7. The computer-implemented method of claim 1, wherein the software application runs within an enterprise application platform.

8. A system of comprising:
at least one hardware processor of a managed private cloud architecture serving an organization; and
a non-transitory computer-readable medium of the managed private cloud architecture, the non-transitory computer-readable medium storing executable instructions that, when executed, cause the at least one processor to perform operations comprising:
receiving a request for a report of personal data concerning a data subject that is under processing by a software application; and
in response to the receiving of the request, generating the report of the personal data concerning the data subject that is under processing by the software application, the generating of the report comprising:
inferring implicit information based on explicit data concerning the data subject that is persisted in at least one of a plurality of tables of a relational database of a persistent data storage and a schema for the relational database stored in the persistent data storage, the schema indicating relationships between the plurality of tables of the relational database, the explicit data and the implicit information having been processed by the software application during a runtime of the software application, the implicit information having been inferred during the runtime of the software application and not being persisted outside of the runtime of the software application, the inferring the implicit information comprising:
identifying a relationship between records in a first table of the plurality of tables and records in a second table of the plurality of tables based on the stored schema;
determining that at least a portion of the persisted explicit data is stored in the first table;
determining that there is no pointer that links the at least a portion of the persisted explicit data stored in the first table to any of the records in the second table; and
determining the implicit information based on the identifying of the relationship, the determination that the at least a portion of the persisted explicit data is stored in the first table, and the determination that there is no pointer that links the at least a portion of the persisted explicit data stored in the first table to any of the records in the second table; and
including the persisted explicit data and the inferred implicit information in the generated report of the personal data concerning the data subject.

9. The system of claim 8, wherein the generating of the report further comprises:
retrieving stored natural language text based on the determining that there is no pointer that links the at least a portion of the persisted explicit data stored in the first table to any of the records in the second table; and
including the retrieved natural language text in the report in association with the inferred implicit information.

10. The system of claim 9, wherein the including the retrieved natural language text in the report comprises using a structured query language (SQL) SELECT statement that includes the retrieved natural language text to generate the report.

11. The system of claim 8, wherein the operations further comprise causing the generated report to be displayed on a computing device.

12. The system of claim 8, wherein the request comprises a user-initiated request that is triggered in response to user input received from a computing device of a user.

13. The system of claim 8, wherein the request comprises one of a plurality of requests automatically triggered on a periodic basis.

14. The system of claim 8, wherein the software application runs within an enterprise application platform.

15. A non-transitory machine-readable storage medium of a managed private cloud architecture serving an organization, the non-transitory machine-readable storage medium tangibly embodying a set of instructions that, when executed by at least one hardware processor, causes the at least one processor to perform operations comprising:
receiving a request for a report of personal data concerning a data subject that is under processing by a software application; and
in response to the receiving of the request, generating the report of the personal data concerning the data subject that is under processing by the software application, the generating of the report comprising:
inferring implicit information based on explicit data concerning the data subject that is persisted in at least one of a plurality of tables of a relational database of a persistent data storage and a schema for the relational database stored in the persistent data storage, the schema indicating relationships between the plurality of tables of the relational database, the explicit data and the implicit information having been processed by the software application during a runtime of the software application, the implicit information having been inferred during the runtime of the software application and not being persisted outside of the runtime of the software application, the inferring the implicit information comprising:
identifying a relationship between records in a first table of the plurality of tables and records in a second table of the plurality of tables based on the stored schema;
determining that at least a portion of the persisted explicit data is stored in the first table;
determining that there is no pointer that links the at least a portion of the persisted explicit data stored in the first table to any of the records in the second table; and
determining the implicit information based on the identifying of the relationship, the determination that the at least a portion of the persisted explicit data is stored in the first table, and the determination that there is no pointer that links the at least a portion of the persisted explicit data stored in the first table to any of the records in the second table; and
including the persisted explicit data and the inferred implicit information in the generated report of the personal data concerning the data subject.

16. The non-transitory machine-readable storage medium of claim 15, wherein the generating of the report further comprises:
    retrieving stored natural language text based on the determining that there is no pointer that links the at least a portion of the persisted explicit data stored in the first table to any of the records in the second table; and
    including the retrieved natural language text in the report in association with the inferred implicit information.

17. The non-transitory machine-readable storage medium of claim 16, wherein the including the retrieved natural language text in the report comprises using a structured query language (SQL) SELECT statement that includes the retrieved natural language text to generate the report.

18. The non-transitory machine-readable storage medium of claim 15, further comprising causing the generated report to be displayed on a computing device.

19. The non-transitory machine-readable storage medium of claim 15, wherein the request comprises a user-initiated request that is triggered in response to user input received from a computing device of a user.

20. The non-transitory machine-readable storage medium of claim 15, wherein the request comprises one of a plurality of requests automatically triggered on a periodic basis.

\* \* \* \* \*